United States Patent [19]

Kumada

[11] Patent Number: 4,974,945
[45] Date of Patent: Dec. 4, 1990

[54] OPTICAL MODULATOR

[75] Inventor: Akira Kumada, Kyoto, Japan

[73] Assignee: Murata Manufacturing Co., Ltd., Japan

[21] Appl. No.: 254,456

[22] Filed: Oct. 6, 1988

[30] Foreign Application Priority Data

Oct. 6, 1987 [JP] Japan .................. 62-251851

[51] Int. Cl.$^5$ ............................................. G02B 5/30
[52] U.S. Cl. ................................... 350/384; 350/392; 350/393; 250/250
[58] Field of Search ............... 350/376, 384, 393, 403, 350/344, 350 R, 354, 355, 356, 358, 96.14, 96.2; 356/43; 374/165–177; 332/3–7; 313/13–17

[56] References Cited

U.S. PATENT DOCUMENTS

| | | | |
|---|---|---|---|
| 3,938,878 | 2/1976 | Fox | 350/356 |
| 4,066,338 | 1/1978 | Hattori et al. | 350/356 |
| 4,070,621 | 1/1978 | Bassen et al. | 350/393 |
| 4,277,146 | 7/1981 | Morgan et al. | 350/356 |
| 4,283,114 | 8/1981 | Wandrack | 350/96.20 |
| 4,358,957 | 11/1982 | Lougheed et al. | 374/165 |
| 4,428,873 | 1/1984 | Murayama et al. | 350/355 |
| 4,716,449 | 12/1987 | Miller | 350/356 |
| 4,808,009 | 2/1989 | Sittler et al. | 374/164 |

OTHER PUBLICATIONS

"Fast Response... Laser Radiation", Kuzmichev et al., pp. 1591–1594, Radio Engineer and Electronic Physics, vol. 14, No. 10, 1969.

*Primary Examiner*—Bruce Y. Arnold
*Assistant Examiner*—Thong Nguyen
*Attorney, Agent, or Firm*—Ostrolenk, Faber, Gerb & Soffen

[57] ABSTRACT

In an optical modulator, an electro-optic crystal is used. A pyroelectric body is connected to the electro-optic crystal through electrical interconnections. A polarizer and an analyzer are respectively arranged in spaced relation to an input side and an output side of the electro-optic crystal. The pyroelectric body receives heat generated by any of light, laser light, an electric resistor or heat generated from absorption of an electromagnetic wave or a radioactive ray. When heat energy is applied to the pyroelectric body, charges are produced in the pyroelectric body, so that a voltage based on the charges is applied to the electro-optic crystal. In this way, a plane of polarization in the electro-optic crystal is rotated so that the amount of light passing through the analyzer is varied in accordance with an applied heat energy.

6 Claims, 2 Drawing Sheets

FIG. 4
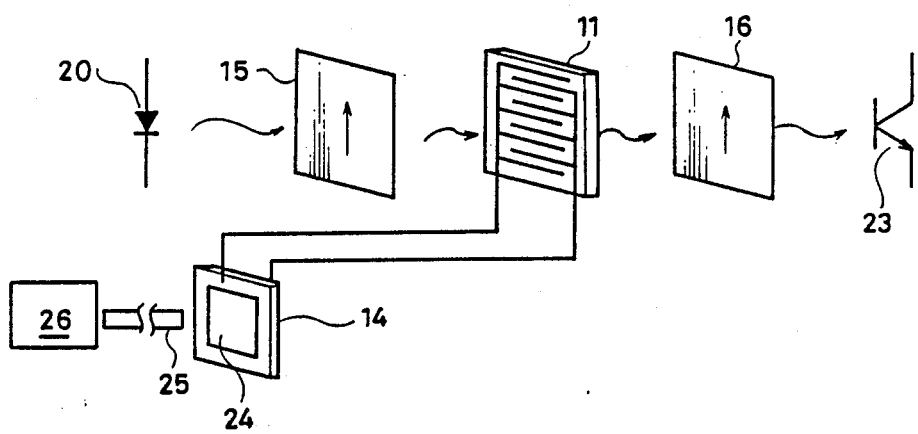
FIG. 6
FIG. 5
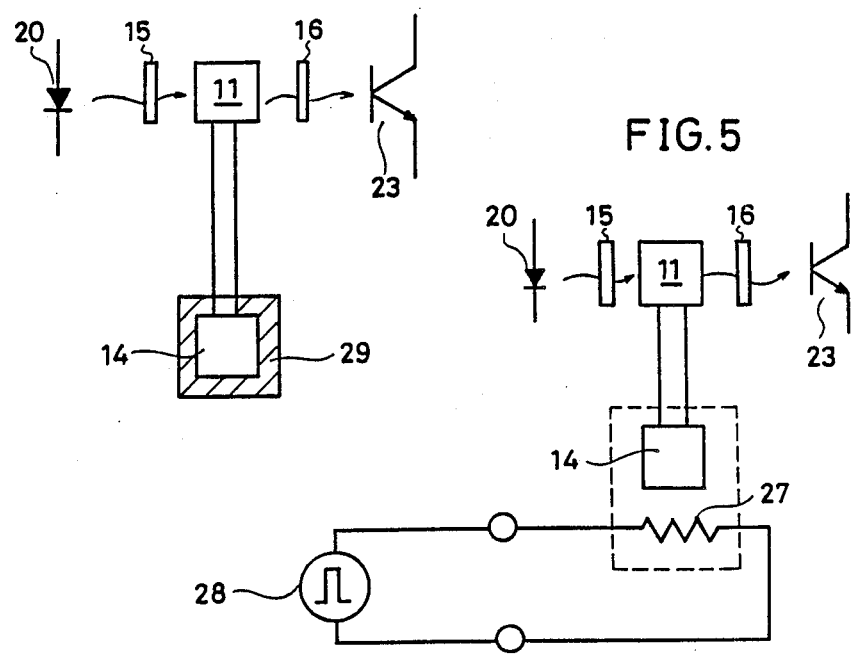

OPTICAL MODULATOR

BACKGROUND OF THE INVENTION

1. Field of the Invention

The present invention relates generally to an optical modulator for modulating light and more particularly, to an optical modulator using an electro-optic crystal.

2. Description of the Prior Art

An optical modulator using an electro-optic crystal can perform a high-speed operation. Thus, conventionally, the electro-optic crystal has been used for modulating a light signal which is transmitted through an optical fiber. In FIG. 1 showing one example of an optical modulator, electrodes 2 and 3 are provided on upper and lower surfaces of the electro-optic crystal 1. A modulating signal generating apparatus 4 is connected to the electrodes 2 and 3. A predetermined voltage is applied between both the electrodes 2 and 3 by the modulating signal generating apparatus 4. In addition, a polarizer 5 on an input side and an analyzer 6 on an output side are provided spaced apart from the electro-optic crystal 1 by a predetermined interval along a light entering direction (represented by an arrow A). Arrows illustrated in the polarizer 5 and the analyzer 6 indicate a direction of a plane of polarization.

In general, an electro-optic crystal is a ferroelectric substance, which has both piezoelectric and pyroelectric characteristics. Conventionally, an electro-optic crystal has been applied to a temperature sensor and an electric field sensor utilizing the foregoing characteristics.

However, piezoelectric and pyroelectric capabilities of the electro-optic crystal are significantly lowered, as compared with, those of a separate piezoelectric and pyroelectric bodies. Thus, it is very difficult to generate pyroelectric charges by heating the electro-optic crystal itself and to modulate light using a voltage based on the pyroelectric charges. In addition, from the relation between the direction of polarization in the electro-optic crystal and anisotropy in a dielectric constant of the crystal, the design of an efficient element is difficult.

Thus, a low-cost temperature sensor and electric field sensor having high sensitivity using the electro-optic crystal cannot be substantially achieved.

SUMMARY OF THE INVENTION

An object of the present invention is to provide an optical modulator using an electro-optic crystal, which avoids the above-noted difficulties arising from using the electro-optic crystal both to generate pyroelectric charges and to modulate light using a voltage based on such charges.

Another object of the present invention is to provide an optical modulator using an electro-optic crystal, which can perform a modulating operation in response to applied heat energy.

Briefly stated, the present invention is directed to an optical modulator comprising an electro-optic crystal for modulating light which is transmitted by application of a voltage and a pyroelectric body producing charges by heat energy and connected to the electro-optic crystal to apply a voltage based on the charges to the electro-optic crystal.

According to the present invention, since heat energy is supplied to a pyroelectric body and a voltage based on charges produced in the pyroelectric body is applied to an electro-optic crystal for modulating light as transmitted, there can be provided an optical modulator capable of performing a modulating operation in response to thermal input energy.

By receiving heat in a pyroelectric body separate from an electro-optic crystal for modulating light, the present invention avoids the above-noted difficulties arising from using the electro-optic crystal for both functions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing a second embodiment of the present invention;

FIG. 5 is a diagram showing a third embodiment of the present invention; and

FIG. 6 is a diagram showing a fourth embodiment of the present invention.

DESCRIPTION OF THE PREFERRED EMBODIMENTS

Figure 1:
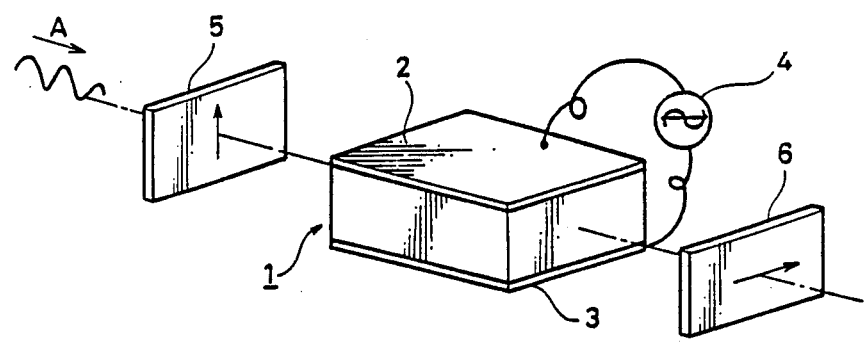
FIG. 1 is a perspective view showing a conventional optical modulator.
Figure 2:
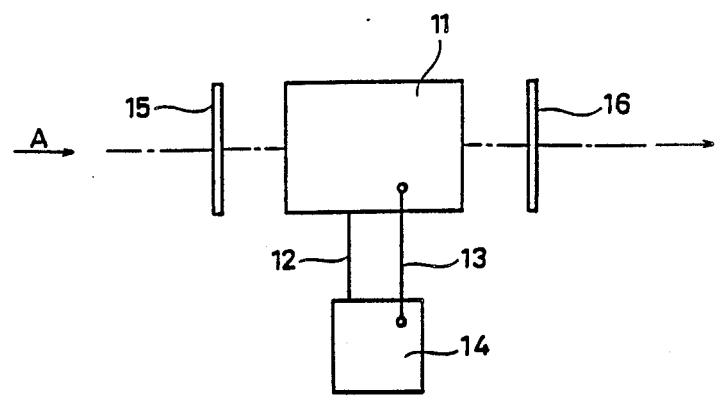
FIG. 2 is a diagram showing a basic structure common to embodiments of the present invention.

In FIG. 2 showing a basic optical-modulator structure common to embodiments of the present invention, a pyroelectric body 14 is connected to an electro-optic crystal 11 through interconnections 12 and 13. A polarizer 15 and an analyser 16 each for extracting linearly polarized light are respectively arranged on input and output sides. The optical modulator may be adapted such that a quarter-wave plate (not shown) is placed just after the analyser 16, to apply an optical bias.

In the optical modulator shown in FIG. 2, when heat energy is supplied to the pyroelectric body 14 by a heat-supplying means, charges are produced in the pyroelectric body 14. A voltage based on the produced charges are applied to the electro-optic crystal 11. An electric field is formed in the electro-optic crystal 11 by this voltage, so that a plane of polarization of light which is transmitted through the electro-optic crystal 11 is changed. Thus, the amount of light passing through the analyser 16 is changed.

The above-described optical modulator can correspond to incident energy corresponding to a generated voltage of several 10s to several 100s V. In addition, the optical modulator according to the present invention can be employed as an optical modulator of relatively low speed capable of modulating light using some thermal input; for example, light energy and electrical energy.

Description is now made of a more specific embodiment. Incident light represented by an arrow A in FIG. 2 is light to be modulated, which is referred to as light to be modulated hereinafter.

EMBODIMENT 1

In embodiment 1, modulating light is sent through a light transmission path having a wavelength different from that of light to be modulated.

Figure 3:
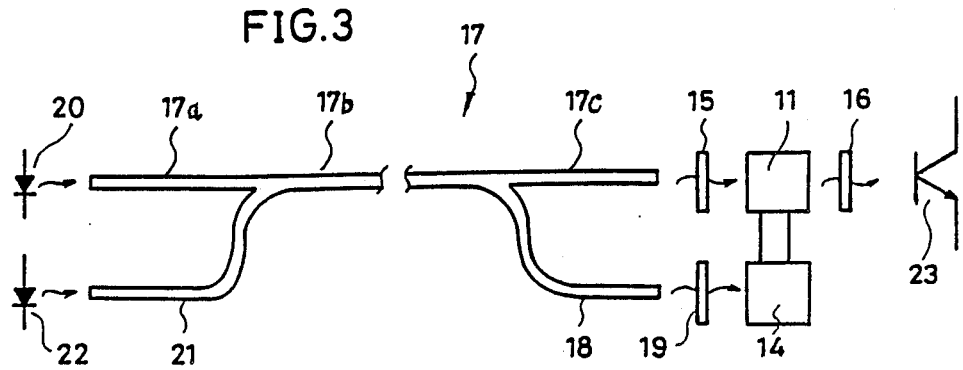
FIG. 3 is a diagram showing a first embodiment of the present invention.

In FIG. 3, portions corresponding to those shown in FIG. 2 have the same reference numerals. In FIG. 3, light is supplied to a polarizer 15 through an optical fiber arrangement 17 having input and output branch portions 17a and 17c, respectively, and an intermediate main trunk portion 17b. Specifically, light from source 20, such as a light-emitting diode, is directed into input branch portion 17a and reaches polarizer 15 via main trunk portion 17b and output branch portion 17c. Light from polarizer 15 reaches analyzer 16 via electro-optic crystal 11, and is then received by a photodetector 23, such as a phototransistor.

A modulating light source 22, such as a light-emitting diode, supplies light to the pyroelectric body 14 via a light path comprising (a) input branch 21, main trunk 17b and output branch 18 of optical fiber arrangement 17, and (b) a filter 19.

FIG. 3 also shows a photodetector 23 such as a phototransistor for receiving modulated light from polarizer 16.

Considering a case in which modulating light is transmitted through the optical fiber arrangement 17; when the modulating light is transmitted over a long distance, its associated signal-to-noise ratio S/N is deteriorated due to absorption and scattering in the fiber arrangement 17. If the signal is of a low frequency, its associated signal-to-noise ratio is liable to be further deteriorated. According to the structure shown in FIG. 3, light to be modulated and modulating light having different wavelengths are sent through the same optical fiber arrangement 17 so that the filter 19 separates both types of light. In this case, light can be modulated just before the photodetector 23 which is a destination of a signal to be transmitted, so that a signal having an associated good signal-to-noise ratio can be transmitted. Meanwhile, the present embodiment is applied to measurement equipment and control equipment using a low-frequency modulating signal.

EMBODIMENT 2

In embodiment 2, light transmitted through a light transmission path different from that through which light to be modulated is transmitted is used as heating means for a pyroelectric body.

In FIG. 4, portions corresponding to those in FIGS. 2 and 3 have the same reference numerals. Furthermore, in FIG. 4, a pyroelectric body 14 is made of PZT ceramics of 5×5×0.1 (Unit mm) thickness. An electro-optic crystal 11 comprises PLZT ceramics of 10×10×0.1 (Unit mm) having a pair of comb-type counter electrodes formed on one surface thereof. A set of a polarizer 15 and an analyser 16 whose polarizing axes are parallel with each other positioned before and behind the electro-optic crystal 11 is provided. A black film 24 is formed on the surface of the pyroelectric body 14 by printing. Laser light is irradiated into the black film 24 through an optical fiber 25. An Ar (argon)laser 26 is provided at the other end of the optical fiber 25.

An output of the Ar (argon) laser 26 is, for example, 100 mW. Laser light from the Ar laser 26 is irradiated into the pyroelectric body 14 through the optical fiber 25 having a length of, for example, 10 m. Laser light is efficiently absorbed by the black film 24 on the pyroelectric body 14. The laser light is irradiated for one second using, for example, a chopper.

On the other hand, light to be modulated produced from a light source 20 of a near infrared light-emitting diode is detected by a photodetector 23 of a phototransistor. If and when a voltage is not applied to the electro-optic crystal 11, a plane of polarization is not rotated in the electro-optic crystal 11, so that the amount of light to be modulated which is incident on the photodetector 23 becomes the maximum.

When laser light is incident on the pyroelectric body 14, the temperature of the pyroelectric body 14 is raised. As a result, a voltage is applied to the comb-type counter electrodes of the electro-optic crystal 11. In this case, due to the rise in temperature of approximately 2° C., a voltage of approximately 100 V is applied to the electro-optic crystal 11. Thus the plane of polarization is rotated in the electro-optic crystal 11, so that the amount of light passing through the analyser 16 is decreased. For example, if a voltage of approximately 100 V is applied, the amount of light is decreased to approximately one-third.

According to this embodiment, light is modulated by a light signal. The embodiment 2 is applied to measurement equipment and control equipment using a low-frequency modulating signal.

EMBODIMENT 3

In the embodiment 3, Joule heat is used as heating means for a pyroelectric body.

In FIG. 5, portions corresponding to those shown in FIGS. 2 and 3 have the same reference numerals. Furthermore, in FIG. 5, a resistor 27 is arranged adjacent to a pyroelectric body 14. The resistor 27 is connected to a modulating signal source 28, which generates heat in response to a voltage signal from the modulating signal source 28. Thus, the pyroelectric body 14 and the resistor 27 are thermally coupled to each other, so that the pyroelectric body 14 is heated by the Joule heat from the resistor 27.

When the resistor 27 generates heat based on the signal voltage from the modulating signal source 28, the temperature of the pyroelectric body 14 is raised, so that a voltage is applied to an electro-optic crystal 11. Thus, a plane of polarization is rotated in the electro-optic crystal 11, so that light to be modulated light from a light source 20 is modulated, leading to a photo detector portion 23.

This embodiment may be employed in a power meter, a heat generation monitor, a heat sensor or the like.

EMBODIMENT 4

In embodiment 4, heating means for a pyroelectric body is an electromagnetic wave other than a so-called ray of light.

In FIG. 6, portions corresponding to those shown in FIGS. 2 and 3 have the same reference numerals. Furthermore, in FIG. 6, an external surface of a pyroelectric body 14 is coated with an absorber 29 for absorbing the electromagnetic wave and changing the same to heat energy.

When the electromagnetic wave are absorbed by the absorber 29 and converted into heat, the temperature of the pyroelectric body 14 is raised. As a result, a voltage is applied to an electro-optic crystal 11, so that a plane of polarization is rotated in the electro-optic crystal 11. Thus, light to be modulated from a light source 20 is modulated, leading to a photodetector 23.

According to this embodiment, light modulated by a an electromagnetic wave such as a radioactive ray can be obtained without directly using an electrical signal. This embodiment can be applied to a remote monitor of the radioactive ray using an optical fiber.

Meanwhile, in the present invention not only amplitude modulation of light, but also phase modulation of light can be performed.

Additionally, heating means for a pyroelectric body are not limited to those according to the above-described embodiments. For example, the heating means may be heat energy externally applied to a pyroelectric body in at least one form of conduction, radiation and convection, to obtain the same effect.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical modulator, comprising:
   a polarizer, an electro-optic crystal and an analyzer arranged serially in a light path;
   said electro-optic crystal having input electrodes for modulating transmitted light passed through said light path in response to a voltage applied to the input electrodes; and
   a pyroelectric body producing electrical charges in response to applied heat energy and having output electrodes connected to said electro-optic crystal input electrodes to apply to the input electrodes a voltage based on said electrical charges.

2. The optical modulator according to claim 1, which further comprises:
   heating means for supplying heat energy to said pyroelectric body.

3. The optical modulator according to claim 2, wherein said heating means comprises:
   light-producing means for producing light; and
   a light transmission path for transmitting to said pyroelectric body the light produced by said light-producing means.

4. The optical modulator according to claim 3, which further comprises a light source for producing light inputted to said electro-optic crystal;
   said light transmission path having an input path for receiving light from said light source and a branched path for transmitting to said electro-optic crystal the light from said light source; and
   a wavelength of the light produced from said light-producing means and transmitted through said light transmission path being different from a wavelength of the light from said light source.

5. The optical modulator according to claim 2, wherein:
   said heating means comprises a resistor for being connected to a power supply.

6. The optical modulator according to claim 2, wherein:
   said heating means comprises an absorber coated on an external surface of said pyroelectric body for absorbing an electromagnetic wave other than a so-called ray of light and converting the electromagnetic wave into heat energy.

* * * * *